(12) United States Patent
Knox

(10) Patent No.: US 9,394,935 B2
(45) Date of Patent: *Jul. 19, 2016

(54) HOOK ASSEMBLY WITH VARIABLE ANGULAR HOOK ORIENTATION

(71) Applicant: Ancra International LLC, Azusa, CA (US)

(72) Inventor: Howard T. Knox, Independence, KY (US)

(73) Assignee: Ancra International LLC, Azusa, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 14/020,287

(22) Filed: Sep. 6, 2013

(65) Prior Publication Data

US 2015/0069775 A1    Mar. 12, 2015

Related U.S. Application Data

(63) Continuation of application No. 13/460,907, filed on May 1, 2012, now Pat. No. 8,646,820.

(60) Provisional application No. 61/482,321, filed on May 4, 2011, provisional application No. 61/508,779, filed on Jul. 18, 2011.

(51) Int. Cl.
*B66C 1/34* (2006.01)
*F16B 45/00* (2006.01)
*F16B 45/02* (2006.01)

(52) U.S. Cl.
CPC .............. *F16B 45/00* (2013.01); *F16B 45/02* (2013.01); *Y10T 24/4755* (2015.01)

(58) Field of Classification Search
CPC ..... F16B 45/00; F16B 45/02; Y10T 24/4755; B66C 1/34
USPC ......... 294/26, 82.1, 82.11, 82.15, 82.16, 175, 294/191
See application file for complete search history.

(56) References Cited

U.S. PATENT DOCUMENTS

| 1,404,117 | A |  | 1/1922 | Hanson |
| 1,605,187 | A |  | 11/1926 | Holt |
| 1,657,260 | A |  | 1/1928 | Holt |
| 1,733,508 | A |  | 10/1929 | Minor |
| 1,806,908 | A |  | 5/1931 | Long |
| 1,922,386 | A |  | 8/1933 | Minor |
| 2,508,595 | A |  | 5/1950 | Christensen |
| 3,848,689 | A |  | 11/1974 | Hilterhaus ................... 177/233 |
| 3,912,318 | A |  | 10/1975 | Engh ............................ 294/82 R |
| 4,039,219 | A |  | 8/1977 | Bugman ..................... 294/82 R |
| 4,720,932 | A |  | 1/1988 | Bovino ................................ 43/5 |
| 8,646,820 | B2 | * | 2/2014 | Knox .......................... 294/82.15 |
| 2010/0007159 | A1 |  | 1/2010 | Henrion ....................... 294/82.2 |

* cited by examiner

Primary Examiner — Dean Kramer

(74) Attorney, Agent, or Firm — Brinks Gilson & Lione

(57) ABSTRACT

A hook assembly made up of a hook subassembly with a hook having a first axis, a support subassembly, and an indexing mechanism. The indexing mechanism: a) releasably biasably maintains the hook and support subassemblies in a first operative relationship wherein the hook has a first angular orientation around the first axis; and b) permits the hook and support subassemblies to be changed from the first operative relationship to be releasably maintained in a second operative relationship, wherein the hook has a second angular orientation around the first axis.

25 Claims, 10 Drawing Sheets

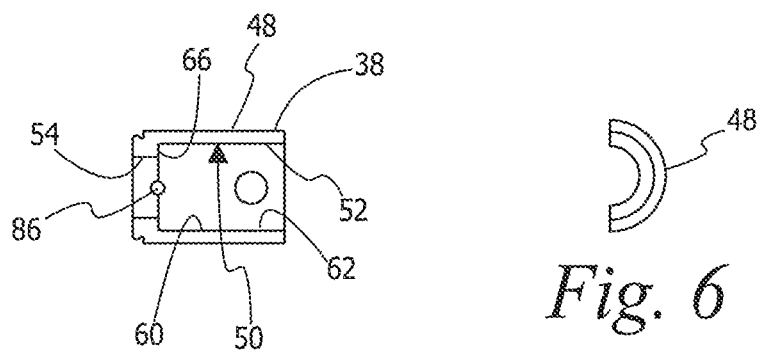
Fig. 5
Fig. 6
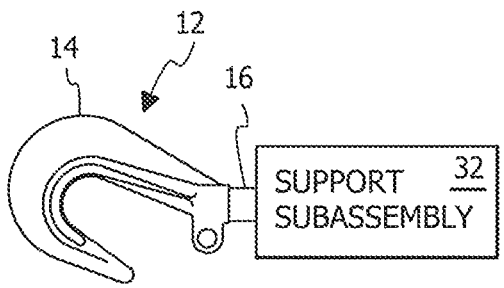
Fig. 7
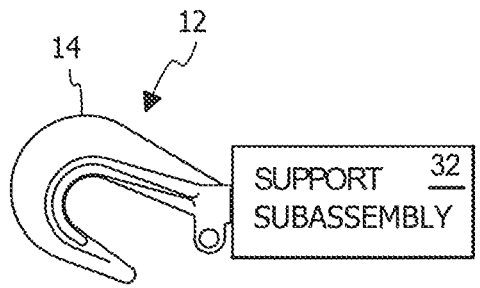
Fig. 8
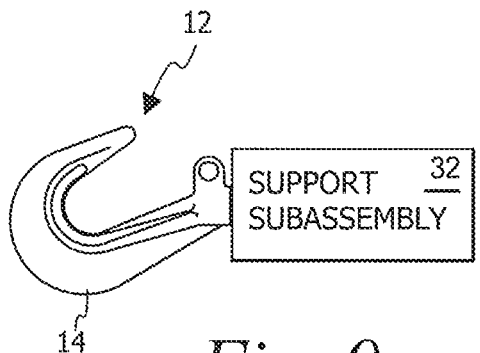
Fig. 9
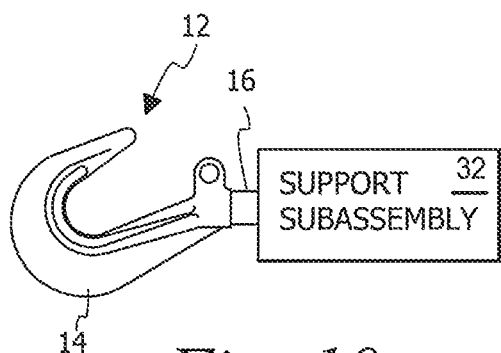
Fig. 10

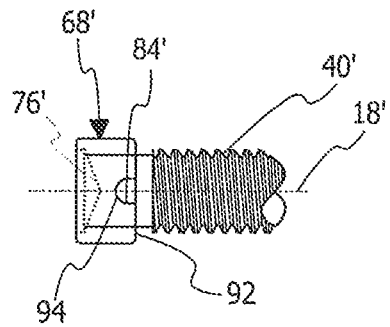
Fig. 12
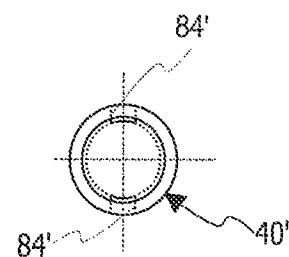
Fig. 14
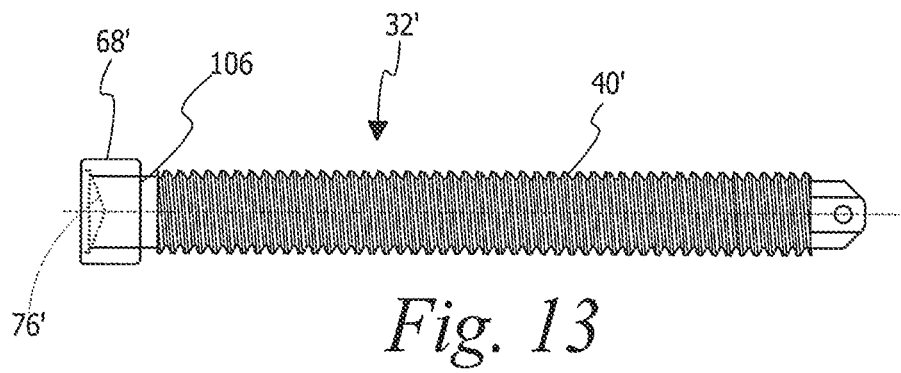
Fig. 13
Fig. 15
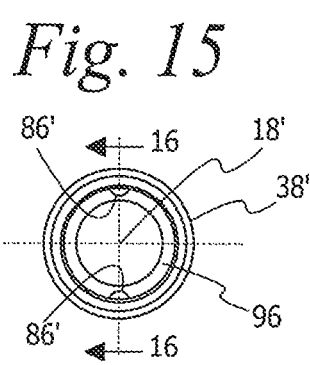
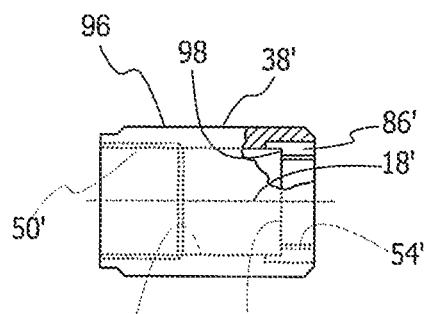
Fig. 16

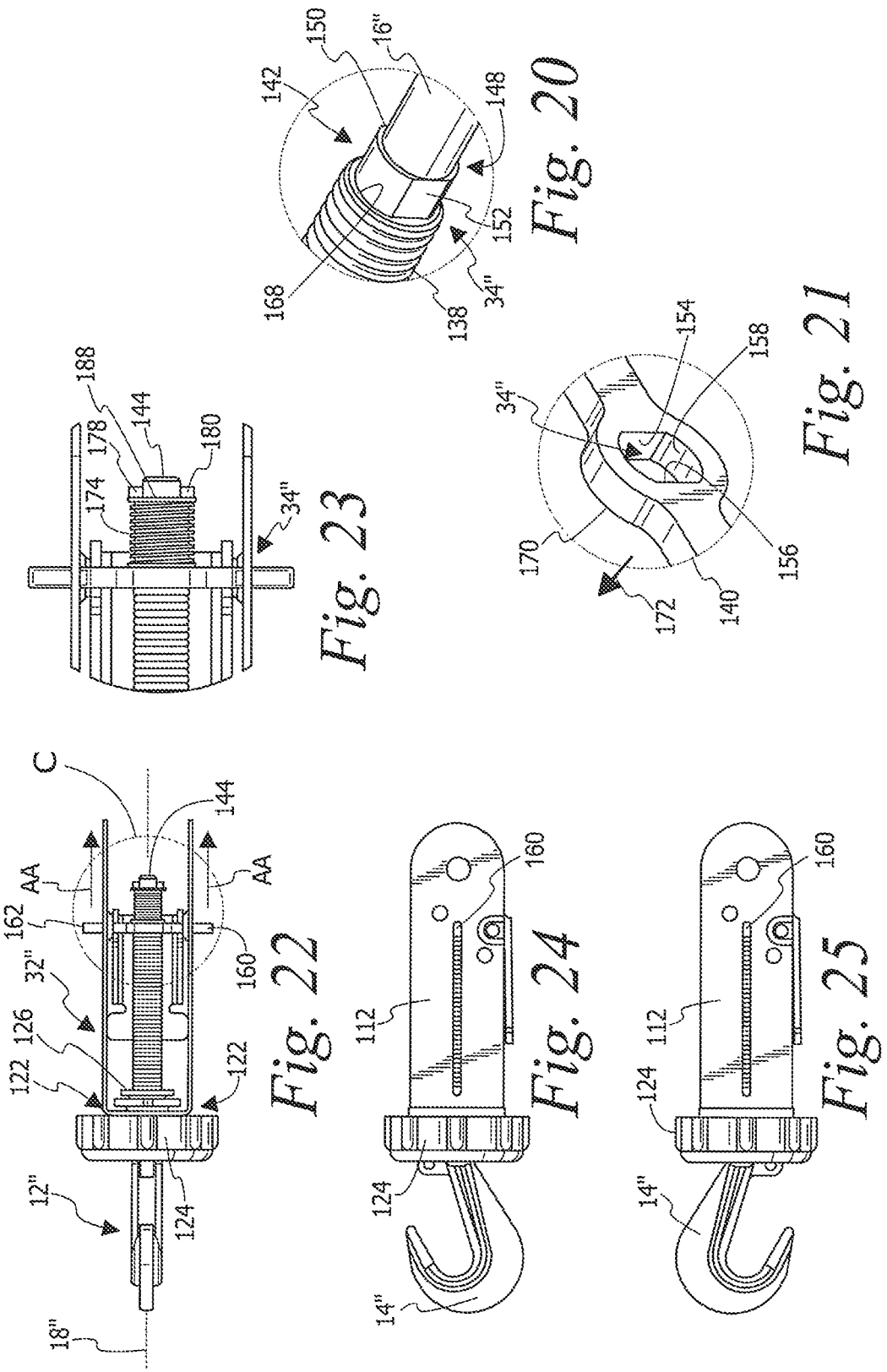

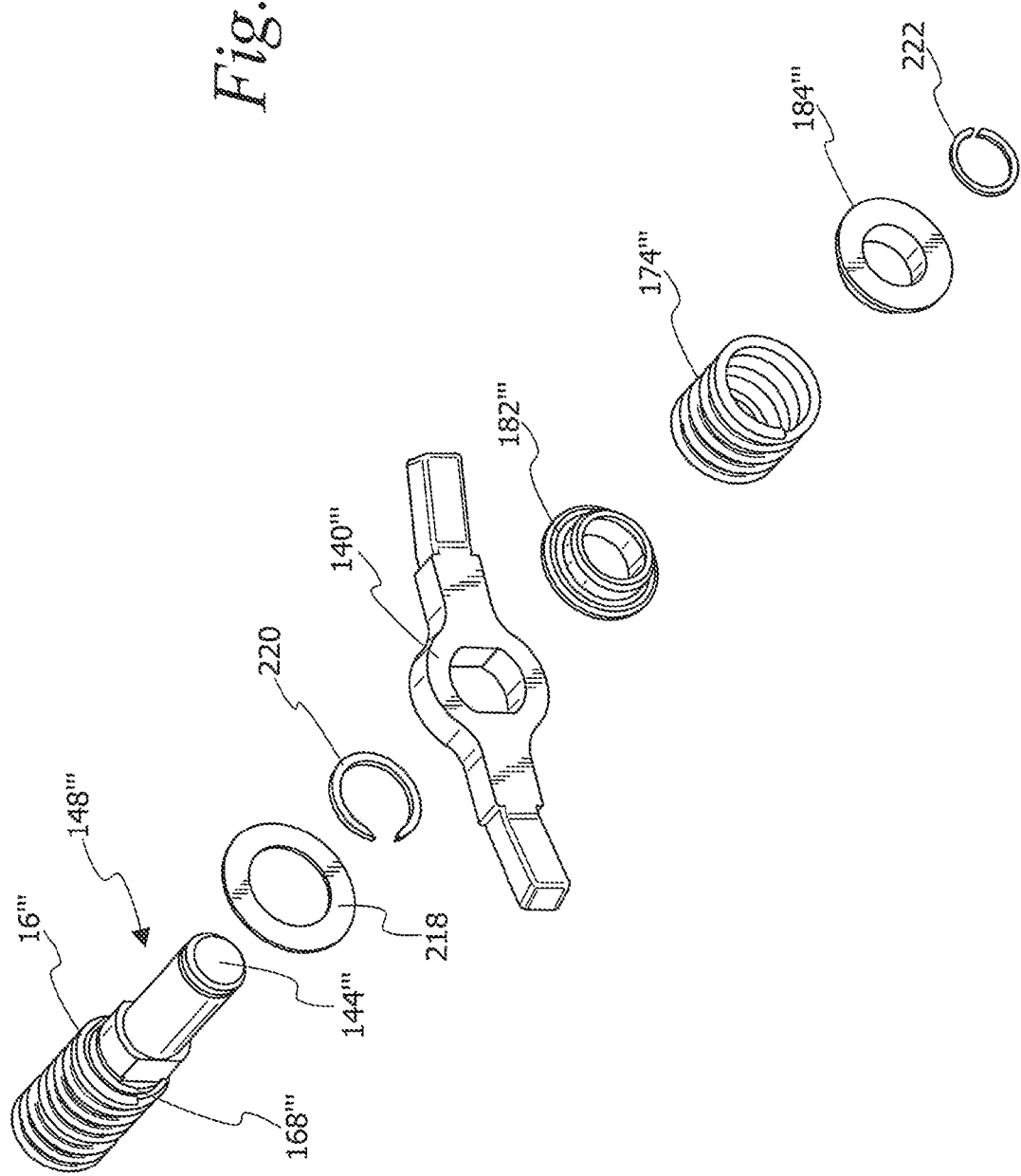

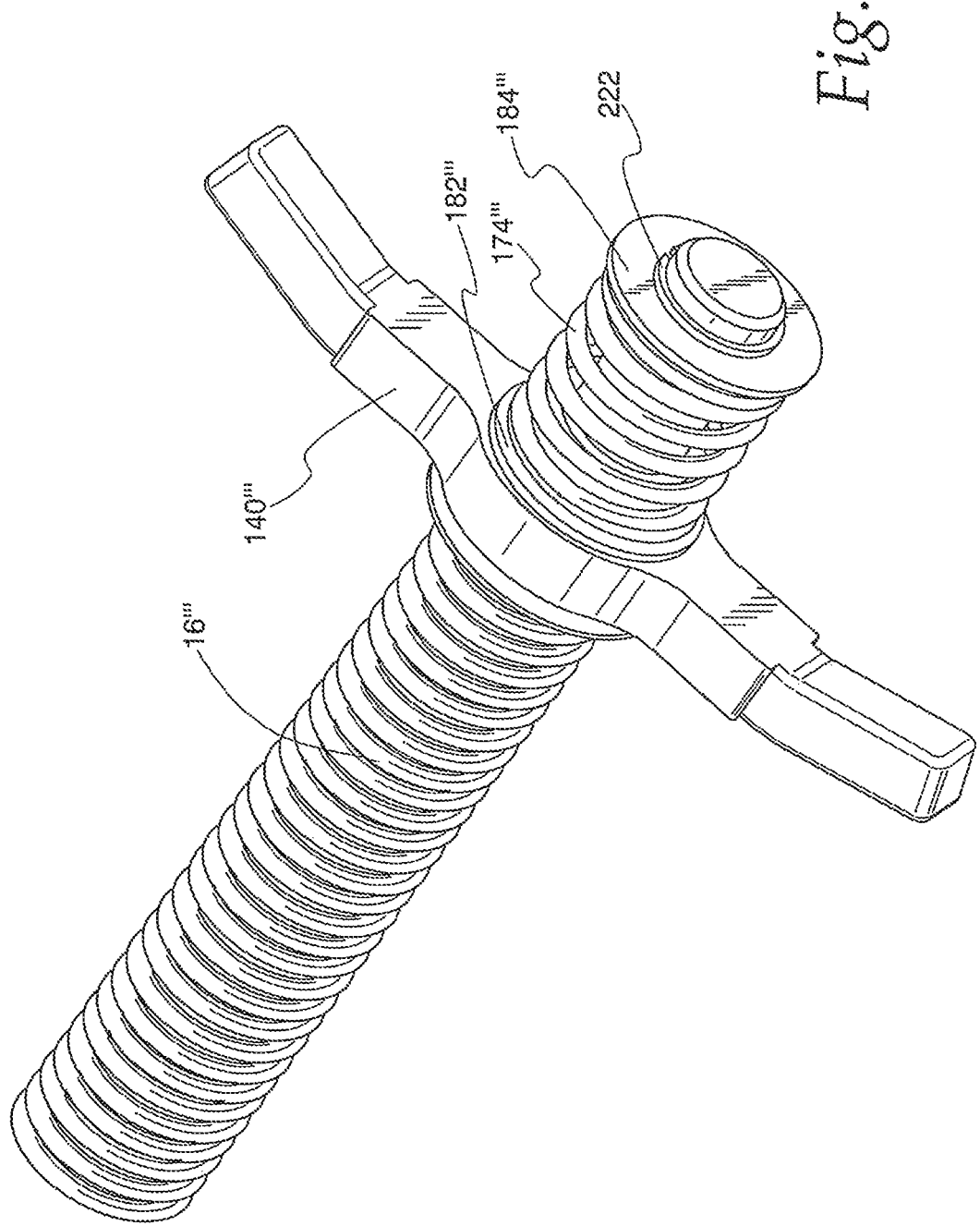

HOOK ASSEMBLY WITH VARIABLE ANGULAR HOOK ORIENTATION

This application is a continuation application of pending U.S. application Ser. No. 13/460,907, filed on May 1, 2012, which claimed priority from U.S. Provisional Application No. 61/482,321, filed on May 4, 2011 and U.S. Provisional Application No. 61/508,779, filed on Jul. 18, 2011, the entirety of each are hereby fully incorporated by reference herein.

BACKGROUND OF THE INVENTION

1. Field of the Invention

This invention relates to hooks, as used on straps, chains, cable, ropes, and the like and, more particularly, to a hook that can be selectively reconfigured relative to a support component to have different angular orientations.

2. Background Art

Hooks are commonly used at the ends of straps, chains, cable, ropes, and the like, for many different applications and in many different industries and environments. In one exemplary structure, a hook assembly is made up of a hook that is on a support component that attaches to a chain end. These hook assemblies are commonly used to secure and hold down cargo, as on moving vehicles with trailers. The hook has a generally "J" shape that resides in a plane with a fixed angular relationship to the support component. Because certain applications require different angular orientations for the hook, when a device with a fixed hook configuration is utilized, it becomes necessary to keep on hand at least two different hook assembly types, In the event that the support component is fixedly attached to the chain, it becomes necessary to keep on hand not only the separate hook assembly configurations but also their associated chain lengths.

The need to have available separate hook assembly configurations creates a number of problems and challenges. First, those responsible for overseeing use of the hook assemblies must try to anticipate the needed quantity of each hook configuration. To avoid the possibility of a shortage of a needed hook assembly configuration, an excess number of each configuration may be kept on hand, Shortages of a necessary hook assembly configuration may cause job interruption and delay, whereas excess inventory takes up valuable space, requires separate handling and storage, and for these and other reasons detrimentally impacts efficiency and bottom line.

Further, the entire hook assembly, together with the associated chain, may be bulky and heavy. Thus, job supervisors contend with the problem of transporting these potentially heavy hook assemblies to make certain that the needed configurations are available at each site. This may involve maneuvering of heavy and bulky hook assemblies to sites where they are ultimately not even used.

While reconfigurable hook assembly designs are known, to the knowledge of the inventor herein, these designs have not been commercially implemented, presumably because they have not been feasible from either the standpoint of function or cost. The industry continues to seek out designs that are versatile yet are not compromised in terms of their strength or integrity.

SUMMARY OF THE INVENTION

In one form, the invention is directed to a hook assembly consisting of a hook subassembly having a hook with a first axis, a support subassembly, and an indexing mechanism made up of at least cooperating components on the hook and support subassemblies. The indexing mechanism: a) releasably biasably maintains the hook and support subassemblies in a first operative relationship wherein the hook has a first angular orientation relative to the support subassembly around the first axis; and b) permits the hook and support subassemblies to be changed from the first operative relationship to be releasably maintained in a second operative relationship, wherein the hook has a second angular orientation relative to the support subassembly around the first axis by: i) relatively moving at least first and second components on the hook subassembly, support subassembly, and indexing mechanism along the first axis against a biasing force produced on at least one of the first and second components with the hook and support subassemblies initially in the first operative relationship to thereby place the hook subassembly, support subassembly, and indexing mechanism into a first transition relationship; ii) with the hook subassembly, support subassembly and indexing mechanism in the first transition relationship:, relatively turning at least part of the hook and support subassemblies around the first axis to thereby place the hook subassembly, support subassembly, and indexing mechanism into a second transition relationship; and iii) with the hook subassembly, support subassembly, and indexing mechanism in the second transition relationship, relatively moving the at least first and second components along the first axis under the biasing force to thereby place the hook and support subassemblies into the second operative relationship.

In one form, the indexing mechanism has a coil spring that acts between the hook and support subassemblies and generates the biasing force that acts generally parallel to the first axis.

In one form, one of the hook and support subassemblies has a fixed sleeve that abuts to the other of the hook and support subassemblies to limit relative movement between the hook and support assemblies along the first axis with the hook and support subassemblies in each of the first and second operative relationships.

In one form, the sleeve extends fully around the first axis over an axial extent of each of the hook and support subassemblies.

In one form, the hook subassembly has an elongate shank and the support subassembly has a body. The indexing mechanism is made up of; a) the first component that is movable relative to the elongate shank along the first axis; and b) the second component. The first component is keyed against turning relative to the body around the first axis. The second component includes a portion of the shank. The portion of the shank and first component have keying surfaces that cooperate to prevent the shank and body from turning relative to each other around the first axis with the hook and support subassemblies in each of the first and second operative relationships.

In one form, the body has an elongate slot and the first component is movable relative to the body along the first axis and has a radially projecting arm that is guided in the slot as the first component moves relative to the body along the first axis.

In one form, the body has first and second slots and the first component has radially oppositely projecting arms that are guided one each in the first and second slots as the first component moves relative to the body along the first axis.

In one form, the keying surfaces on the portion of the shank are first and second flat surfaces, and the keying surfaces on the first component are flat surfaces that abut to the first and second flat surfaces with the hook and support subassemblies in each of the first and second operative relationships.

In one form, the body has a "U" shape with a base and spaced legs and the elongate shank extends through the base.

In one form, the hook assembly further includes an adjusting mechanism for selectively changing a position of the shank relative to the body along the first axis.

In one form, the adjusting mechanism is located at the base and has an actuator that is turned around the first axis to thereby selectively move the shank relative to the body along the first axis.

In one form, the shank and adjusting mechanism have cooperating threads and the actuator is turned around the first axis to cause the cooperating threads to interact so as to move the shank relative to the body along the first axis.

In one form, the adjusting mechanism includes a ratchet assembly for allowing movement of the actuator in only one direction around the first axis.

In one form, the body has first and second parts that are joined to define the "U" shape.

In one form, the support assembly has a connecting assembly for an elongate member.

In one form, the connecting assembly is configured to releasably secure an end of an elongate member to the body.

In one form, the hook assembly is provided in combination with an elongate member that is operatively secured to the body. The elongate member consists of one of: a) a chain; b) a strap; c) a rope; and d) a cable.

In one form, the indexing mechanism has a coil spring that surrounds the shank and acts between a first axially facing surface on the shank and the first component.

In one form, there is a second axially facing surface on the shank that faces towards the first axially facing surface and the first component is confined axially between the first and second axially facing surfaces.

In one form, the shank extends through the first component.

BRIEF DESCRIPTION OF THE DRAWINGS

FIG. 5 is a side elevation view of one of two like joinable parts that define a sleeve making up part of an indexing mechanism for the hook assembly.

FIG. 6 is an end elevation view of the sleeve part in FIG. 5;

FIGS. 7-16 are sequential, schematic showings of the transition of the hook assembly from a first state in FIG. 7, wherein the hook and support subassemblies are in a first operative relationship, and a second state, as shown in FIG. 10, wherein the hook and support subassemblies are in a second operative relationship;

FIG. 11 is a side elevation view of a modified form of hook assembly, according to the present invention, and including cooperating hook and support subassemblies, with a sleeve broken away to show cooperating components on an indexing mechanism;

FIG. 12 is a fragmentary, side elevation view of the support subassembly in FIG. 11;

FIG. 13 is a side elevation view of the support subassembly in FIG. 12 in a different angular orientation;

FIG. 14 is an end elevation view of the support subassembly in FIGS. 12 and 13;

FIG. 15 is an end elevation view of the sleeve on the hook assembly in FIG. 11;

FIG. 16 is a cross-sectional view of the sleeve taken along line 16-16 of FIG. 15;

FIG. 20 is an enlarged view of a portion of the hook subassembly within the circle A in FIG. 19 and showing a keying component thereon;

FIG. 21 is an enlarged view of a portion of a guide element on the support subassembly in FIG. 19 within the circle B therein;

FIG. 22 is a top view of the assembled hook assembly in FIG. 19 and with the hook and support subassemblies in a first operative relationship;

FIG. 23 is an enlarged view of a portion of the hook assembly within the circle C in FIG. 22;

FIG. 24 is a side elevation view of the hook assembly in the FIG. 22 state;

FIG. 25 is a view as in FIG. 24 with the hook and support subassemblies in a second operative relationship;

FIG. 27 is an enlarged, fragmentary, exploded, perspective view of an end of the hook subassembly in FIG. 26 including a spring bias component; and FIG. 28 is a view as in FIG. 27 with the components assembled.

DETAILED DESCRIPTION OF THE PREFERRED EMBODIMENT

Figure 1:
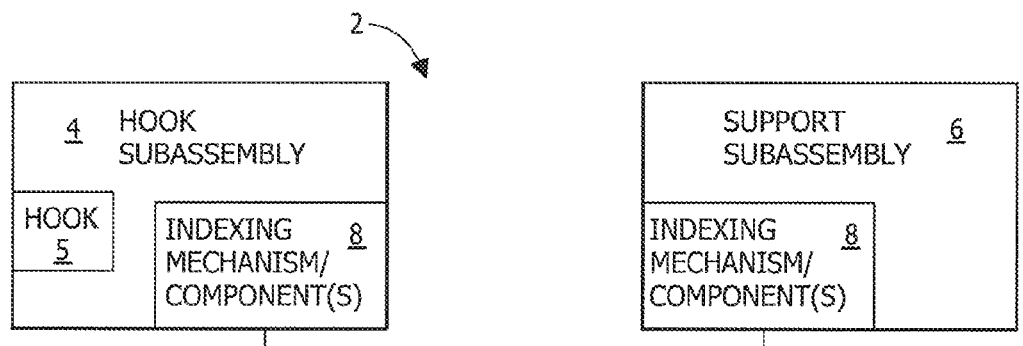
FIG. 1 is a schematic representation of a hook assembly, according to the present invention.

A generic form of hook assembly, according to the present invention, is shown at 2 in FIG. 1. The schematic showing is intended to encompass the different embodiments disclosed herein as well as other variations which would be devisable by one skilled in the art with the inventive principles in hand.

The inventive hook assembly 2 consists of a hook subassembly 4 including a hook 5 with a first axis, a support subassembly 6, and an indexing mechanism 8 made up of at least cooperating components on the hook and support subassemblies 4, 6.

The indexing mechanism 8: a) releasably biasably maintains the hook and support subassemblies 4, 6 in a first operative relationship wherein the hook 5 has a first angular orientation relative to the support subassembly 6 around the first axis; and b) permits the hook and support subassemblies 4, 6 to be changed from the first operative relationship to be releasably maintained in a second operative relationship, wherein the hook 5 has a second angular orientation relative to the support subassembly around the first axis. This is accomplished by: i) relatively moving at least first and second components on the hook subassembly 4, support subassembly 6, and indexing mechanism 8 along the first axis against a biasing force produced on at least one of the first and second components, with the hook and support subassemblies 4, 6 initially in the first operative relationship, to thereby place the hook subassembly 4, support subassembly 6, and indexing mechanism 8 into a first transition relationship; ii) with the hook subassembly 4, support subassembly 6, and indexing mechanism 8 in the first transition relationship, relatively turning at least part of the hook and support subassemblies 4, 6 around the first axis to thereby place the hook subassembly 4, support subassembly 6, and indexing mechanism 8 into a second transition relationship; and iii) with the hook subassembly 4, support subassembly 6, and indexing mechanism 8 in the second transition relationship, relatively moving the at least first and second components along the first axis under the biasing force to thereby place the hook and support subassemblies 4, 6 into the second operative relationship, Referring initially to FIGS. 2-6, one specific form of hook assembly, according to the present invention, is shown at 10. The hook assembly 10 consists of a hook subassembly 12, made of a generally C-shaped hook 14 that is integral with a shank 16 that has a first axis 18. A keeper 20 is mounted to the hook 14 for pivoting movement around an axis 22 between the dotted line position and solid line position in FIG. 3. By pivoting the keeper 20 from the solid line position into the dotted line position, a member 24 to be engaged by the hook 14 can be directed through the hook throat 26 into a U-shaped receptacle 28. Once the member 24 is within the receptacle 28, the keeper 20 is permitted to pivot back to the solid line position where it is blocked against one leg 30 of the hook 14 to prevent escape of the member 24 from the receptacle 28.

The hook assembly 10 further includes a support subassembly 32 that cooperates with the hook subassembly 12 as hereinafter described.

The hook assembly 10 further includes an indexing mechanism at 34 that consists of cooperating components on, and cooperating between, the hook and support subassemblies 12, 32, respectively.

Figure 2:
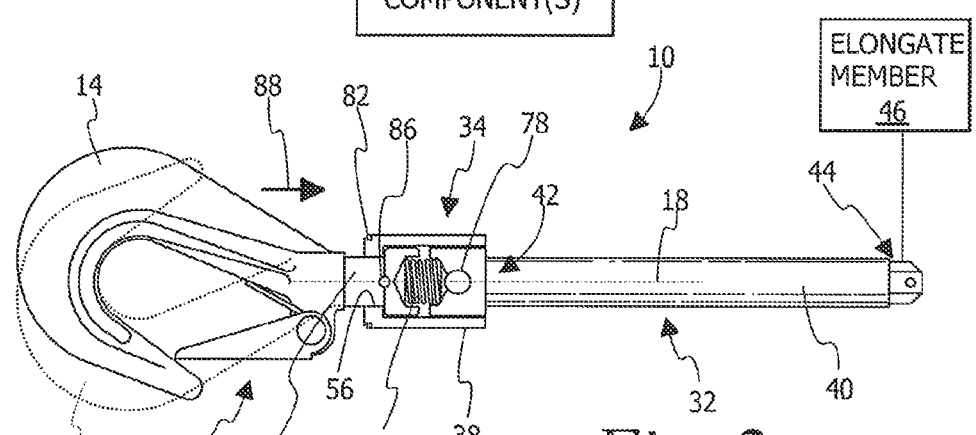
FIG. 2 is a side elevation view of one specific form of hook assembly, according to the present invention, and consisting of cooperating hook and support subassemblies with parts thereof broken away.
Figure 3:
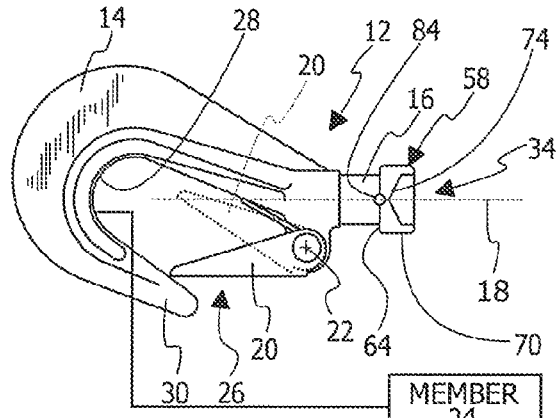
FIG. 3 is a site elevation view of the hook subassembly on the hook assembly in FIG. 1.
Figure 4:
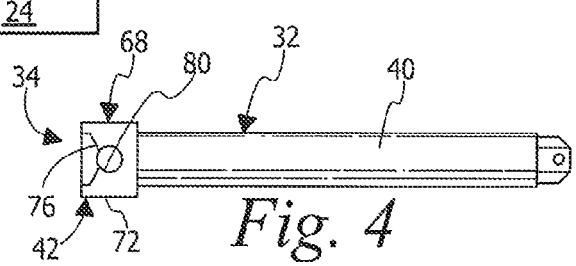
FIG. 4 is a side elevation view of the support subassembly on the hook assembly in FIG. 1.
Figure 11:
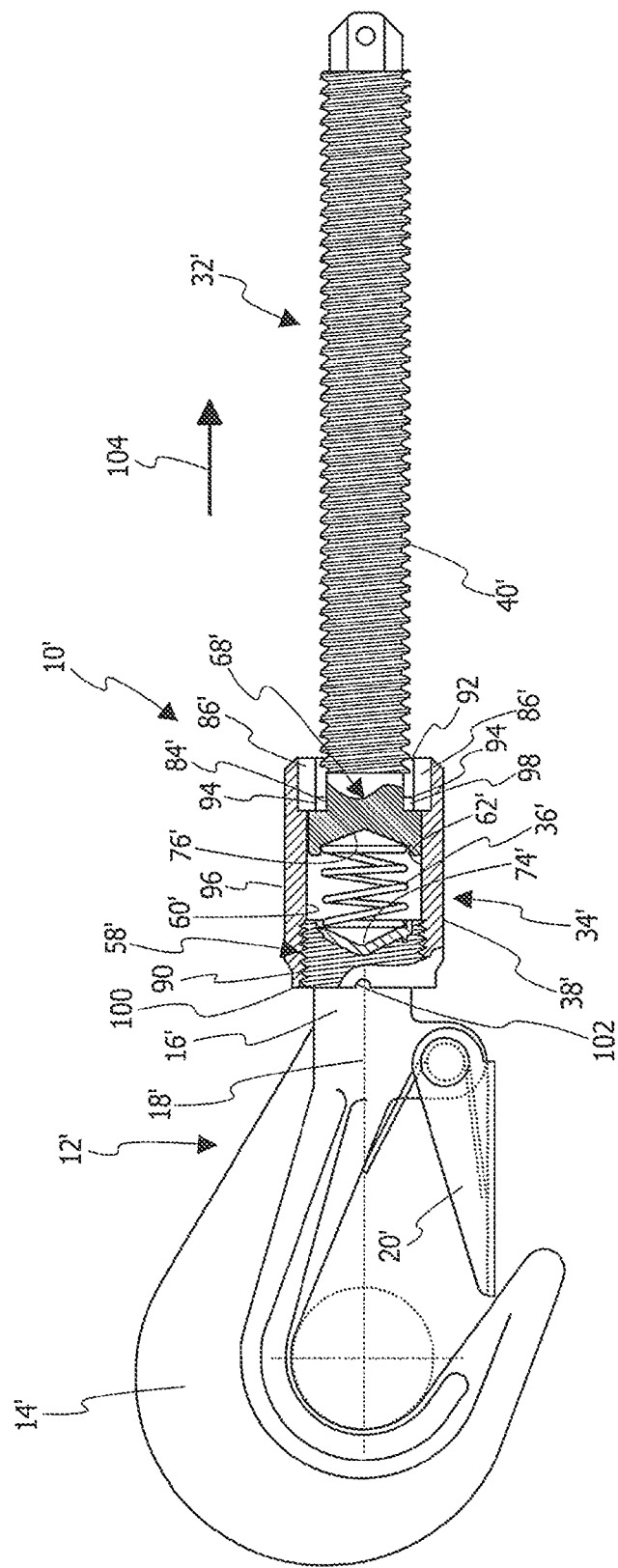
Figure 17:
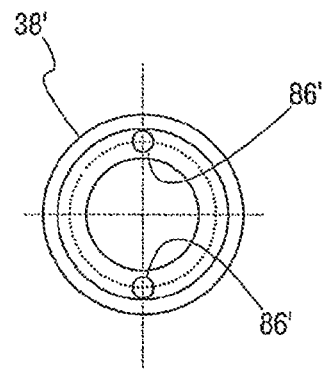
FIG. 17 is an enlarged, end elevation view of the sleeve from the end opposite that in FIG. 15.

The indexing mechanism 34: a) releasably biasably maintains the hook and support subassemblies 12, 32 in a first operative relationship, as shown schematically in FIG. 7 and in solid lines in FIG. 2, wherein the hook 14 has a first angular orientation relationship with the support subassembly 32 around the first axis 18; and b) permits the hook and support subassemblies 12, 32 to be changed from the first operative relationship to be releasably maintained in a second operative relationship, as shown schematically in FIG. 10, and in dotted lines in FIG. 2, wherein the hook 14 has a second angular orientation relative to the support subassembly 32 around the first axis 18.

This transition is effected by relatively moving the hook and support subassemblies 12, 32, corresponding to the first and second parts referenced with respect to the hook assembly 2 in FIG. 1, along the first axis 18 against a biasing force produced by a coil spring 36, with the hook and support subassemblies 12, 32 initially in the first operative relationship, to thereby place the hook and support subassemblies 12, 32 and indexing mechanism 34 into a first transition relationship, as shown schematically in FIG. 8. With the hook and support subassemblies 12, 32 and indexing mechanism in the first transition relationship, the hook and support subassemblies 12, 32 are relatively turned around the first axis 18 to place the hook and support subassemblies 12, 32 and indexing mechanism 34 into a second transition relationship, as shown in FIG. 9.

With the hook and support subassemblies 12, 32 and indexing mechanism 34 in the second transition relationship, the hook and support subassemblies 12, 32 are relatively moved along the first axis 18 into the second operative relationship under the biasing force produced by the coil spring 36.

More specifically, a sleeve 38 is fixed to a shaft 40 on the support subassembly 32, to move as one piece therewith. The sleeve 38 is adjacent to one axial end 42 of the shaft 40, with the opposite axial end 44 of the shaft 40 connected to a chain or other elongate member 46.

In this embodiment, the sleeve 38 consists of identical sleeve parts 48 that are joined to each other from diametrically opposite sides of the shaft 40 to define a continuous annular body extending around the first axis 18, that also defines the central axis of the shaft 40.

The sleeve 38 defines a stepped diameter through bore 50 with a larger diameter portion 52 and smaller diameter portion 54.

The smaller diameter portion 54 accepts the shank 16 and has an annular surface 56 that guides movement of the shank 16 around the first axis 18 as the hook and support subassemblies 12, 32 are changed between their first and second operative relationships.

The free end of the shank 16 has an enlargement 58 that resides within a chamber 60 at the larger diameter portion 52 of the bore 50 and bounded by a surface 62. An annular surface 64 on the enlargement 58 confronts an annular surface 66 defined on the sleeve 38 at the transition between the larger and smaller diameter portions 52, 54 of the bore 50.

The shaft 40 has an enlargement 68 that resides within the chamber 60. The enlargements 58, 68 have outer surfaces 70, 72 dimensioned to move guidingly against the surface 62 along and around the first axis 18.

The enlargements 58, 68 respectively have cup-shaped receptacles 74, 76 that open towards each other, with each configured to receive an end of the coil spring 36 which becomes captive therebetween.

With the enlargements 58, 68 residing within the chamber 60, and the coil spring 36 captive therebetween, a solid rivet 78 passes through the joined sleeve parts 48 and a bore 80 through the enlargement 68 between the sleeve parts 48. A retaining ring 82 surrounds the axial end of the sleeve, remote from the end at which the rivet 78 is secured, to enhance the integrity of the sleeve 38.

The enlargement 58 has axially opening indexing keys 84 (one shown) at diametrically opposite locations. The separate indexing keys 84 are designed to cooperate, one each, with complementary projections 86 that are directed from the sleeve part 48 into the bore 50.

With the hook and support subassemblies 12, 32 in the first operative relationship, the annular surface 64 on the enlargement 58 abuts to the annular surface 66 on the sleeve 38 while at the same time the projections 86 seat in the indexing keys 84 to thereby prevent turning of the hook and support subassemblies 12, 32 relative to each other around the first axis 18.

By pressing the hook assembly 12 axially in the direction of the arrow 88 relative to the support assembly 32, the enlargement 58 moves closer to the enlargement 68 and compresses the coil spring 36 to increase the biasing force produced thereby tending to move the enlargements 58, 68 axially away from each other. At the same time, the projections 86 unseat from the indexing keys 84 to thereby allow the hook and support assemblies 12, 32 to relatively turn around the first axis 18 to the second operative relationship, wherein the surfaces 64, 66 will again abut and the projections 86 will seat in the indexing keys 84. The diametrically opposite relationship of the indexing keys and projections 86 allows them to cooperate in the same manner with the hook and support subassemblies 12, 32 in each of the first and second operative relationships.

Because the spring 36 becomes compressed as the transition between the first and second operative relationships for the hook and support subassemblies 12, 32 is effected, the biasing force drives the hook subassembly 12 positively in an axial direction oppositely to the direction of the arrow 88, to place the hook and support subassemblies 12, 32 in either of the first and second operative relationships.

The sleeve 38 extends fully around the first axis 18 over an axial extent of each of the hook and support subassemblies 12, 32, to positively guide the subassemblies 12, 32 as they are relatively moved both axially and around the first axis 18.

A modified form of hook assembly, according to the present invention, is shown at 10' in FIGS. 11-18 and made up of hook and support subassemblies 12', 32' and indexing mechanism 34'. (Parts on the hook assembly 10', corresponding to those on the hook assembly 10 in FIGS. 2-10, will be identified with the same reference numerals plus a "'" designation.)

The hook assembly 10' has a hook 14' with a shank 16' having an enlargement 58' with external threads 90. The enlargement 58' defines a spring receptacle 74'. The hook 14' has an associated keeper 20'.

The support subassembly 32' consists of a threaded shaft 40' with an enlargement 68' defining a spring receptacle 76'.

The enlargement 68' has radially undercut, diametrically opposite indexing keys 84' that extend from one axial end 92 of the enlargement 68', and terminate at axially facing stop surfaces 94.

A sleeve 38' has an uninterrupted annular body 96 that extends fully around the axis 18'. Projections 86' extend into a chamber 60' bounded by an annular surface 62'. The projections 86' terminate at ends 98 and are situated to register, one each, with the indexing keys 84'.

The hook assembly 10' is assembled by initially directing the shaft 40' from left to right through the sleeve. 38'. This movement may be arrested by the abutment of the ends 98 of the projections 86' to the enlargement 68', but is primarily blocked by the interaction of annular surfaces, as described below. A coil spring 36' is directed into the receptacle 76'. The spring 36' becomes captive between the enlargement 68' and the enlargement 58' that is threaded into the sleeve 38' at the end 100. With the enlargement 58' fully inserted, the sleeve 38' can be crimped to be deformed into diametrically opposite notches 102 (one shown) on the enlargement 58'.

Once the components are assembled, the hook subassembly 12' can be shifted axially in the direction of the arrow 104, which causes the projections 86' to move out of the indexing keys 84', whereupon the hook subassembly 12' can be turned relative to the support subassembly 32' as in the prior embodiment. Once the force on the hook subassembly 12' is released, the compressibly loaded spring 36' generates a substantial biasing force that urges the hook subassembly 12' oppositely to the direction indicated by the arrow 104 to re-seat the projections 86' in the indexing keys 84' with the hook and support subassemblies 12', 32' in their desired angular orientation.

The enlargement 68' has an annular shoulder 106 that bears against a facing annular surface 108 formed at a transition between a smaller diameter surface 54' and a larger diameter surface portion 52' that collectively make up a stepped throughbore 50'.

In this embodiment, the projections and indexing keys can be arranged to permit any relative angular orientation between the hook and support subassemblies to be maintained. For example, the two different angular orientations may be changed 90° from each other. Further, more than two different angular orientations can be maintained with any desired different angular relationships. It is possible to use a single projection or single indexing key that cooperates with any of a plurality of strategically located indexing keys and projections.

This same selection of angular adjustment for hooks is contemplated for all other embodiments herein.

A further modified form of hook assembly, according to the invention, is shown at 10" in FIGS. 19-25. Parts on the hook assembly 10", corresponding to those on the hook assembly 10 in FIGS. 2-10, will be identified with the same reference numerals plus a "''" designation.

The hook assembly 10" is made up of a hook subassembly 12" and a support subassembly 32". The hook assembly 10" further includes an indexing mechanism at 34" that consists of cooperating components on, and cooperating between, the hook and support subassemblies 12", 32", respectively.

The hook subassembly 12" has a C-shaped hook 14" that is integral with an elongate threaded shank 16" with a lengthwise first axis 18". The hook 14" is shown without a keeper, such as the keeper 20, described earlier. The same configuration of keeper could be utilized on the hook 14".

The support subassembly 32" consists of a U-shaped body 112 defined by a base 114 and spaced legs 116, 118 projecting in parallel relationship away from the base 114.

An adjusting mechanism at 120 cooperates with the shank 16" to allow selective movement of the shank 16" back and forth along the axis 18", thereby to change the spacing between the hook 14" and the body 112.

More particularly, the adjusting mechanism 120 consists of a two-part actuator 122 with first and second parts 124, 126 connected together with the body base 114 captive therebetween. The second actuator part 126 has a post 128 that extends through an opening 130 in the base 114 and into a complementary receptacle 132 in the actuator part 124. The post 128 has at least one flat 134 thereon to make a keyed connection with the actuator part 124 so that the parts 124, 126 turn together around the axis 18". The actuator part 124 has a contoured exterior to facilitate hand grasping and turning.

The actuator part 126 has a throughbore 135 with internal threads 136 to mate with threads 138 on the shank 16". With the shank 16' extended through the actuator part 124 and into threaded engagement with the actuator part 126, turning of the actuator parts 124, 126 causes the shank 16", and thus the associated hook 14", to move along the axis 18" in a direction dictated by the direction of turning of the actuator parts 124, 126. The actuator parts 124, 126 do not move axially relative to the body 112 as this adjustment is carried out.

The indexing mechanism 34" consists of a first component 140 and a second component at 142 on the shank 16". The legs 116, 118 on the body 112 are also components that make up the indexing mechanism 34".

More specifically, the axial shank end 144, opposite the shank end 146 at which the hook 14" is located, extends through the actuator part 126 and has an exposed portion 148 that is unthreaded. The shank portion 148 extends also through the component 140.

Flat surfaces 150, 152 are formed on the shank portion 148. The surfaces 150, 152 are parallel and face oppositely to each other. With this configuration, the surfaces 150, 152 make a keyed connection with complementary flat surfaces 154, 156 bounding a bore 158 in the first component 140 through which the shank portion 148 extends. With this arrangement, the surfaces 150, 152; 154, 156 cooperate to key the shank portion 148 and first component 140 to each other against turning around the axis 18" with the hook subassembly 12" and first component 140 in the relationship shown in FIGS. 19 and 24, and also with the hook subassembly 12" turned through 180° around the axis 18" relative to the first component 140, as shown in FIG. 25.

The first component 140 is maintained against turning around the axis 18" relative to the body 112 by the cooperation between diametrically projecting arms 160, 162 on the first component 140 and the legs 116, 118 on the body 112. More specifically, the legs 116, 118 have elongate slots 164, 166, respectively, extending parallel to the axis 18". The arms 160, 162 project respectively through the slots 164, 166 and are guidable therealong as the shank 16" is moved, through operation of the adjusting mechanism 120, back and forth along the axis 18".

At the transition between the threads 138 and the second component 142 on the shank 16", an axially facing shoulder 188 is defined. With the shank portion 148 directed through the first component 140, one axially facing surface 170 on the first component 140 abuts to the shoulder 168 to limit movement of the component 140 in the direction of the arrow 172.

The first component 140 is urged against the shoulder 168 by a coil spring 174. The coil spring 174 is located between the mounted first component 140 and a pin 176 that extends radially through the shank 16" adjacent to the end 144. Radially oppositely projecting pin portions 178, 180 block the spring 174 in its operative position.

In this embodiment, stepped washers 182, 184 are pressed into the ends of the coil spring 174 to respectively define axially facing surfaces 186, 188 that directly abut to the first component 140 and pin 176.

With the hook assembly 10" assembled, a force can be exerted simultaneously upon the arms 160, 162 of the first component 140 in the direction of the arrows AA in FIG. 22. This compresses the coil spring 174 and allows the first component 140 to shift axially so as to disengage the flat keying surfaces 150, 152; 154, 156. This allows the hook subassembly 12" to be turned 180° around the axis 18" relative to the body 112 to change the hook and support subassemblies 12", 32" from the first operative relationship in FIGS. 19 and 24 into the second operative relationship in FIG. 25. The indexing mechanism 34", through the coil spring 174, releasably biasably maintains the hook and support subassemblies 12", 34" in each of the first and second operative relationships.

Figure 19:
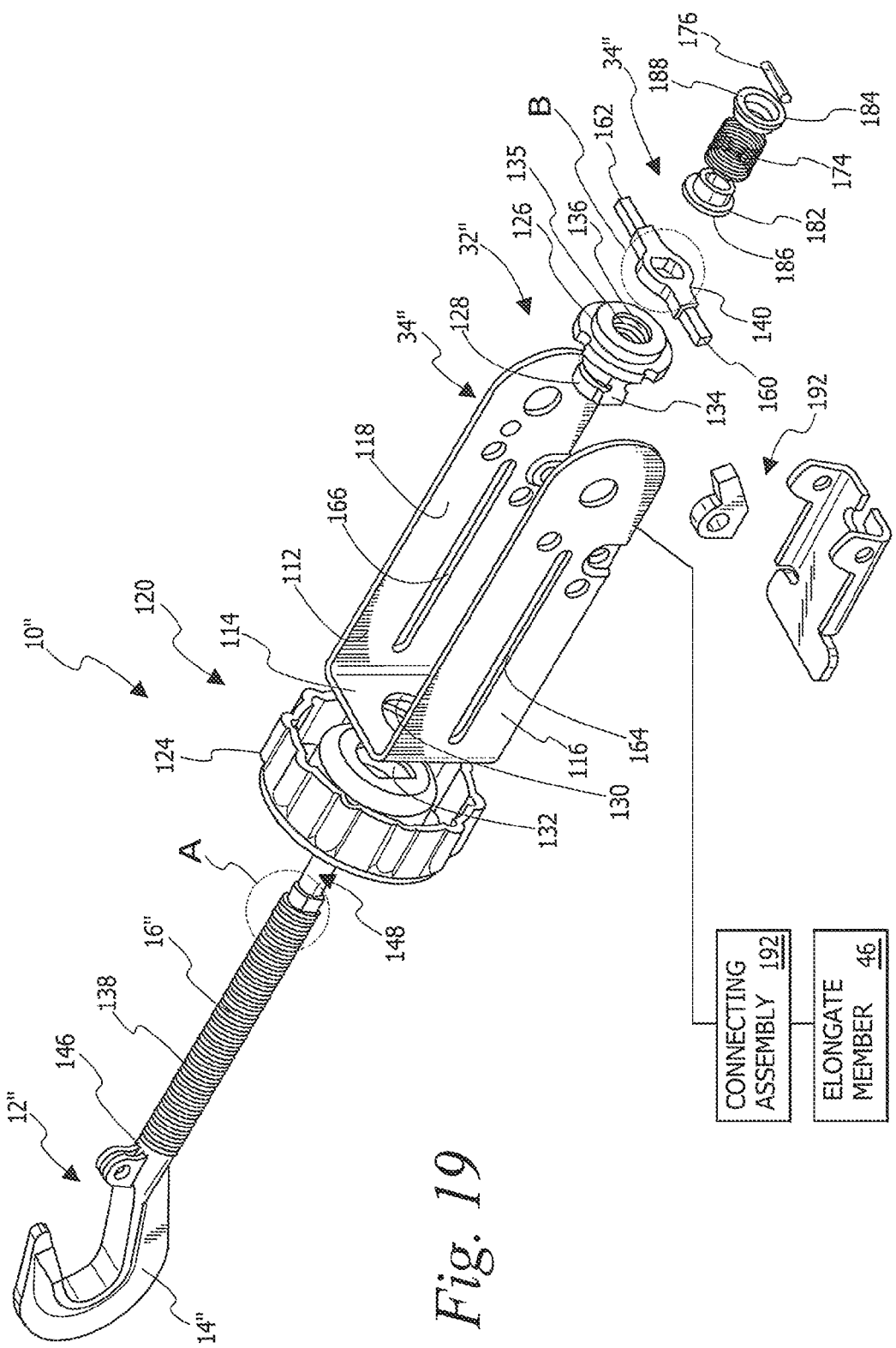
FIG. 19 is an exploded, perspective view of a further modified form of hook assembly, according to the present invention, and consisting of cooperating hook and support subassemblies.

As explained above with respect to the generic showing in FIG. 1, by moving the first component 140 on the indexing mechanism 34" along the first axis 18" against a biasing force produced on the first component 140, the hook and support subassemblies 12", 32" can be changed from the first operative relationship, shown in FIGS. 19 and 24, to place the hook and support subassemblies 12", 32" and indexing mechanism 34" into a first transition relationship.

With the first transition relationship established, the hook subassembly 12" and support subassembly 32" can be relatively turned around the axis 18" to thereby place the hook and, support subassemblies 12", 32' and indexing mechanism 34" into a second transition relationship, With the second transition relationship established, relative movement of the components 140, 142 along the axis 18" under the force of the spring 174 places the hook and support subassemblies 12", 32" into the second operative relationship, which is maintained under this biasing force.

Figure 18:
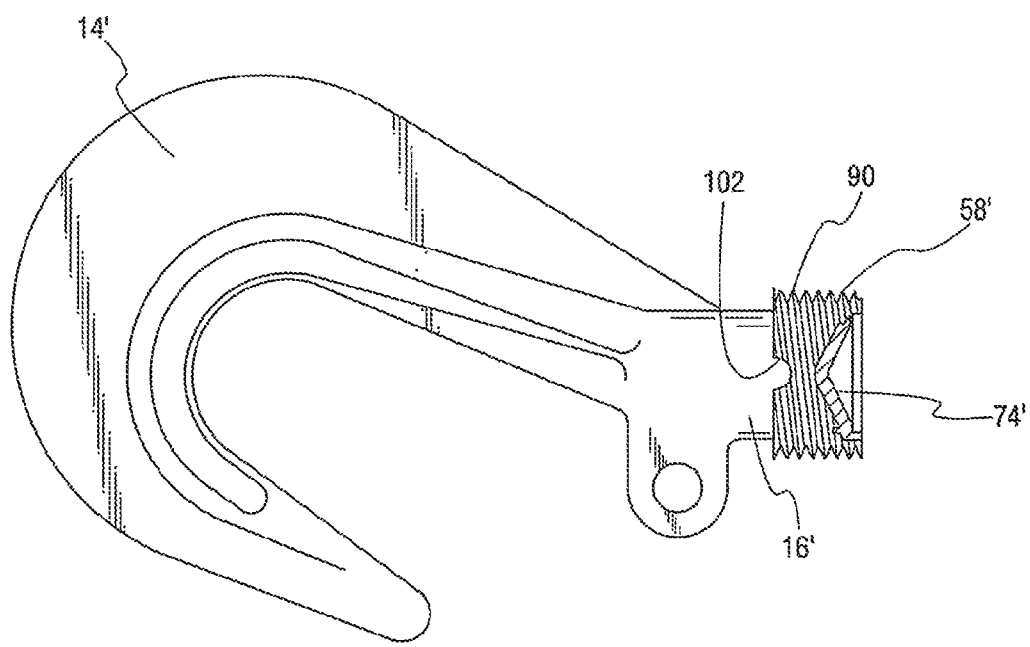
FIG. 18 is an enlarged, side elevation view of the hook subassembly on the hook assembly in FIG. 11.

A connecting assembly 192 on the body 112 releasably secures an end of the elongate member 46, which may be a chain, a strap, a rope, a cable, etc. Two components that make up part of the connecting assembly 192 are shown in FIG. 18. However, since this structure is not critical to the understanding of the present invention, the details thereof are not explained in detail herein.

Figure 26:
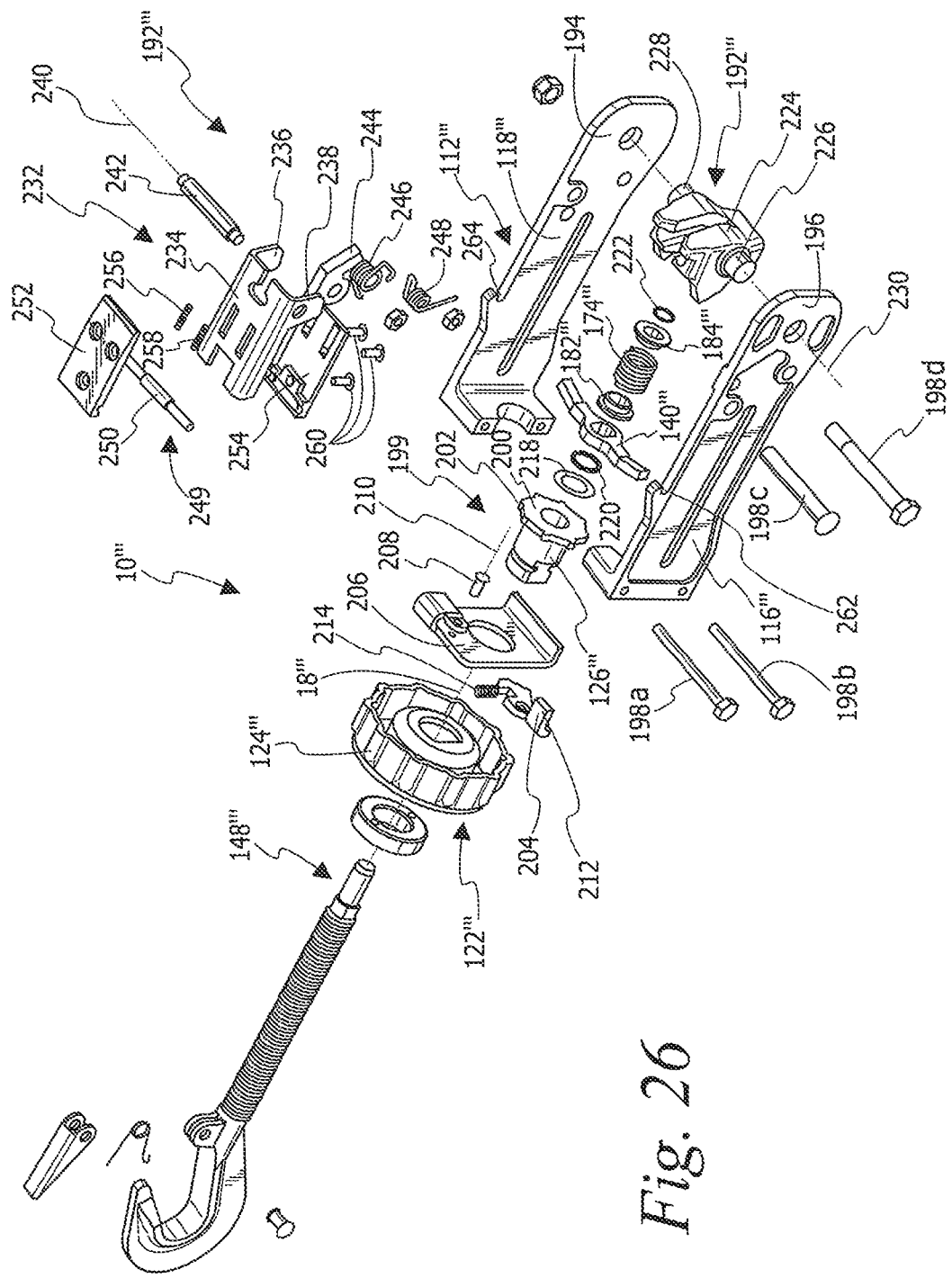
FIG. 26 is an exploded perspective view of a modified form of the inventive hook assembly that is of the same general type shown in FIGS. 18-25.

In FIGS. 26-28, a modified form of hook assembly, according to the present invention is shown at 10". The hook assembly 10' has the same general construction as the hook assembly 10". In describing the structure of the hook assembly 10"', parts corresponding to those in the hook assembly 10" will be identified with the same reference numeral plus a """ designation. Also, only the differences between these structures will be focused upon hereinbelow.

The body 112' is made with separate parts 194, 196 that are joined to produce the same overall "U" shape. Each of the parts is "L"-shaped to be substantially mirror images of each other. The parts 194, 196 are joined as by bolts 198a, 198b, 198c, 198d. The two-part construction facilitates assembly and also allows the parts 194, 196 to be made with a more robust construction. The body 112 on the hook assembly 10" is shown made from a formed piece of metal which thus limits the gauge to one that can be practically bent using conventional techniques.

Further, the two-part construction facilitates the placement of the components between the body legs 116', 118' during the assembly process.

The actuator part 126" is formed with a ratchet assembly 199 including a ratchet component 200 with circumferentially spaced ratchet teeth 202 thereon. The ratchet component 200 cooperates with a pawl 204. The pawl 204 is mounted to a wall 206 through a pivot pin 208 that extends through the pawl 204 and into the wall 206 to guide the pawl 204 in pivoting movement about the pin axis 210. The axis 210 is spaced from and parallel to the axis 18".

With this arrangement, as the joined actuator parts 124"', 126"' are turned around the axis 16", an arm 212 on the pawl 204 rides over the teeth 202 and blocks the teeth 202 at regular intervals. The arm 212 is biased against the teeth 202 by a coil spring 214, With this arrangement, the ratchet assembly 199 allows movement of the actuator 122" in only one direction around the axis 18".

The first component 140"' cooperates with the shaft portion 148"' in the same way as the corresponding component 140 cooperates with the shaft portion 148 on the hook assembly 10". The manner of blocking the component 140"' and coil spring 174"' is slightly modified.

A flat washer 218 surrounds the shaft portion 148"' and is pressed against the shoulder 168"'. A C-clip 220 is pressed onto the shank 16"' as an axial blocking component.

Adjacent to the end 144"' of the shank 16"', a separate C-clip 222 is pressed onto the shank 16"' to bear axially upon the stepped washer 184"' to thereby axially confine the washer 184"' on the shank 16"'. A separate stepped washer 182"' cooperates with the coil spring 174"' and acts against the first component 140"'.

Additional details of the connecting assembly 192"' are shown in FIG. 26. However, as noted above, understanding the details of the connecting assembly 192"' is not critical to the present invention.

Briefly, the connecting assembly 192"' consists of a chain receptacle 224 with oppositely projecting stub shafts 226, 228 that project into the legs 116"', 118"' respectively to guide the receptacle 224 in pivoting around an axis 230. The receptacle 224 cooperates with a chain link (not shown) that is held in place by a subassembly shown at 232, that makes up part of the connecting assembly 192"'.

A release lever 234 has legs 236, 238 that are engageable with the receptacle 224 to keep it in a holding position relative to a chain link. The release lever 234 is moveable relative to the body 112"' around an axis 240 defined by a post 242 that extends through the legs 236, 238 and into the body legs 116"', 118"'. By pivoting the legs 236, 238 out of engagement with the receptacle 224, the receptacle 224 is allowed to pivot under a force exerted by an associated chain. This creates a quick release feature.

A keeper 244 is also mounted for pivoting movement on the post 242 and biased by springs 246, 248 to urge a chain link into a pocket (not shown) on the receptacle 224. The keeper 244 is normally biased to retain the chain link in the receptacle pocket and locks the chain link to the receptacle 224 in the event the chain is loose.

The keeper 244 is maintained in the locking position by not only the springs but additionally by a secondary locking, mechanism at 249 consisting of a pin 250, top plate 252, bottom plate 254, and separate springs 256, 258. The plates 252, 254 are secured by fasteners 260.

The pin 250 seats in a slot defined by the top and bottom plates 252, 254, and is spring-loaded into receptacles 262, 264 defined on the body legs 116''', 118''', respectively. The secondary locking mechanism 249 is released by sliding the pin 250 out of engagement with the receptacles 264, whereupon the release lever 234 can be raised to release the chain.

The foregoing disclosure of specific embodiments is intended to be illustrative of the broad concepts comprehended by the invention.

The invention claimed is:

1. A hook assembly comprising:
a hook subassembly comprising a hook with a first axis;
a support subassembly; and
an indexing mechanism comprising cooperating components on the hook and support subassemblies,
wherein the hook subassembly comprises an elongate shank and the support subassembly comprises a body comprising a base, the indexing mechanism comprising: a) a first component that is movable relative to the elongate shank along the first axis; and b) a second component, the first component keyed against turning relative to the body around the first axis, the second component comprising a portion of the shank, the portion of the shank and first component having keying surfaces that cooperate to prevent the shank and body from turning relative to each other around the first axis with the hook and support subassemblies when the hook is positioned in a first angular relationship with the support subassembly, and when the hook is positioned in a second angular relationship, which is opposite from the first angular relationship, and
wherein the body has an elongate slot and the first component is movable relative to the body along the first axis and has a radially projecting arm that is guided in the slot as the first component moves relative to the body along the first axis.

2. The hook assembly according to claim 1 wherein the indexing mechanism comprises a coil spring that acts between the hook and support subassemblies and generates the biasing force that acts generally parallel to the first axis.

3. The hook assembly according to claim 1 wherein the hook assembly further comprises an adjusting mechanism for selectively changing a position of the shank relative to the body along the first axis.

4. The hook assembly according to claim 3 wherein the adjusting mechanism is located at the base and comprises an actuator that is turned around the first axis to thereby selectively move the shank relative to the body along the first axis.

5. The hook assembly according to claim 4 wherein the shank and adjusting mechanism have cooperating threads and the actuator is turned around the first axis to cause the cooperating threads to interact so as to move the shank relative to the body along the first axis.

6. The hook assembly according to claim 5 wherein the adjusting mechanism comprises a ratchet assembly for allowing movement of the actuator in only one direction around the first axis.

7. The hook assembly according to claim 1, wherein the body has a "U" shape with the base and spaced legs and the elongate shank extends through the base, and wherein the body comprises first and second parts that are joined to define the "U" shape.

8. The hook assembly according to claim 1 wherein the support assembly comprises a connecting assembly for an elongate member.

9. A hook assembly comprising:
a hook subassembly comprising a hook with a first axis;
a support subassembly; and
an indexing mechanism comprising cooperating components on the hook and support subassemblies,
wherein the hook subassembly comprises an elongate shank and the support subassembly comprises a body comprising a base, the indexing mechanism comprising: a) a first component that is movable relative to the elongate shank along the first axis; and b) a second component, the first component keyed against turning relative to the body around the first axis, the second component comprising a portion of the shank, the portion of the shank and first component having keying surfaces that cooperate to prevent the shank and body from turning relative to each other around the first axis with the hook and support subassemblies when the hook is positioned in a first angular relationship with the support subassembly, and when the hook is positioned in a second angular relationship, which is opposite from the first angular relationship,
wherein the body has first and second slots and the first component has radially oppositely projecting arms that are guided one each in the first and second slots as the first component moves relative to the body along the first axis.

10. The hook assembly according to claim 9 wherein the body has a "U" shape with a base and spaced legs and the elongate shank extends through the base.

11. The hook assembly according to claim 10 wherein the body comprises first and second parts that are joined to define the "U" shape.

12. The hook assembly according to claim 9 wherein the hook assembly further comprises an adjusting mechanism for selectively changing a position of the shank relative to the body along the first axis.

13. The hook assembly according to claim 12 wherein the adjusting mechanism is located at the base and comprises an actuator that is turned around the first axis to thereby selectively move the shank relative to the body along the first axis.

14. The hook assembly according to claim 13 wherein the shank and adjusting mechanism have cooperating threads and the actuator is turned around the first axis to cause the cooperating threads to interact so as to move the shank relative to the body along the first axis.

15. The hook assembly according to claim 14 wherein the adjusting mechanism comprises a ratchet assembly for allowing movement of the actuator in only one direction around the first axis.

16. The hook assembly according to claim 9 wherein the support subassembly comprises a connecting assembly for an elongate member.

17. The hook assembly according to claim 16 wherein the connecting assembly is configured to releasably secure an end of an elongate member to the body.

18. The hook assembly according to claim 16 in combination with an elongate member that is operatively secured to the body, the elongate member comprising one of: a) a chain; b) a strap; c) a rope; and d) a cable.

19. A hook assembly comprising:
a hook subassembly comprising a hook with a first axis;
a support subassembly; and
an indexing mechanism comprising cooperating components on the hook and support subassemblies,
wherein the hook subassembly comprises an elongate shank and the support subassembly comprises a body comprising a base, the indexing mechanism comprising: a) a first component that is movable relative to the elongate shank along the first axis; and b) a second component, the first component keyed against turning relative to the body around the first axis, the second component comprising a portion of the shank, the portion of the shank and first component having keying surfaces that cooperate to prevent the shank and body from turning relative to each other around the first axis with the hook and support subassemblies when the hook is positioned in a first angular relationship with the support subassembly, and when the hook is positioned in a second angular relationship, which is opposite from the first angular relationship, and
wherein the indexing mechanism comprises a coil spring that surrounds the shank and acts between a first axially facing surface on the shank and the first component,
wherein the hook assembly further comprises an adjusting mechanism for selectively changing a position of the shank relative to the body along the first axis, wherein the adjusting mechanism is located at the base and comprises an actuator that is turned around the first axis to thereby selectively move the shank relative to the body along the first axis.

20. The hook assembly according to claim 19 wherein there is a second axially facing surface on the shank that faces towards the first axially facing surface and the first component is confined axially between the first and second axially facing surfaces.

21. The hook assembly according to claim 20 wherein the shank extends through the first component.

22. The hook assembly according to claim 19 wherein the shank and adjusting mechanism have cooperating threads and the actuator is turned around the first axis to cause the cooperating threads to interact so as to move the shank relative to the body along the first axis.

23. The hook assembly according to claim 22 wherein the adjusting mechanism comprises a ratchet assembly for allowing movement of the actuator in only one direction around the first axis.

24. The hook assembly according to claim 19 wherein the body has a "U" shape with the base and spaced legs and the elongate shank extends through the base, and the body comprises first and second parts that are joined to define the "U" shape.

25. The hook assembly according to claim 19 wherein the support subassembly comprises a connecting assembly for an elongate member.

* * * * *